Oct. 21, 1969     T. C. HOLKA     3,473,264
DOOR EDGE GUARD
Filed Dec. 20, 1967     2 Sheets-Sheet 1
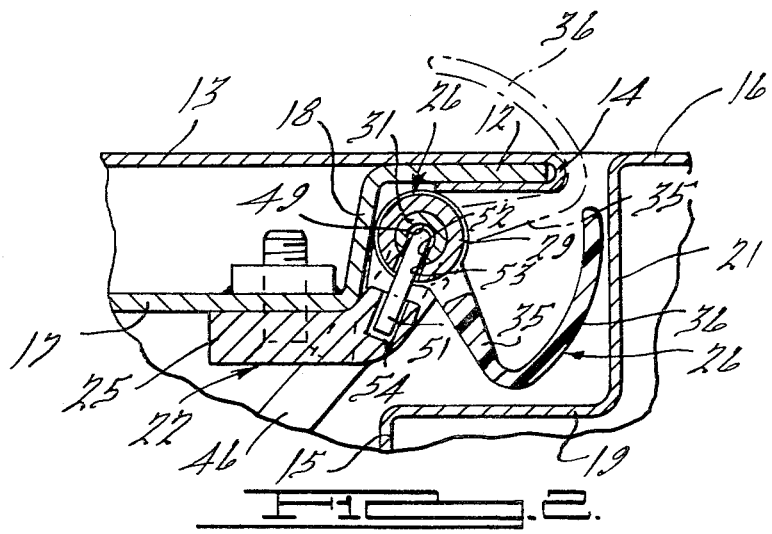
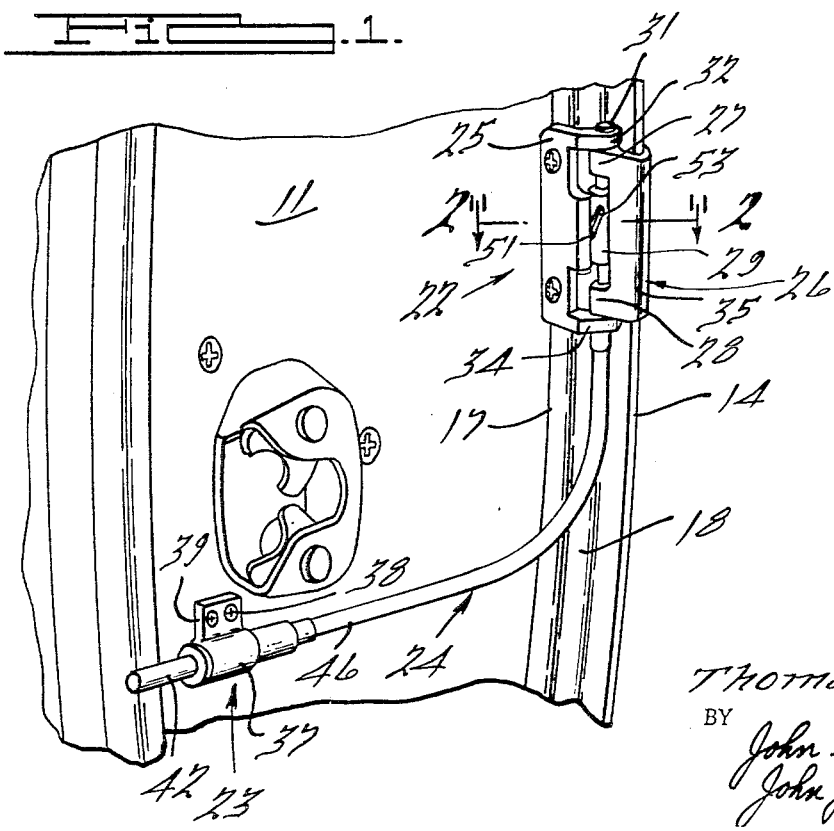
INVENTOR.
Thomas C. Holka
BY John R. Faulkner
John J. Roethel
ATTORNEYS.

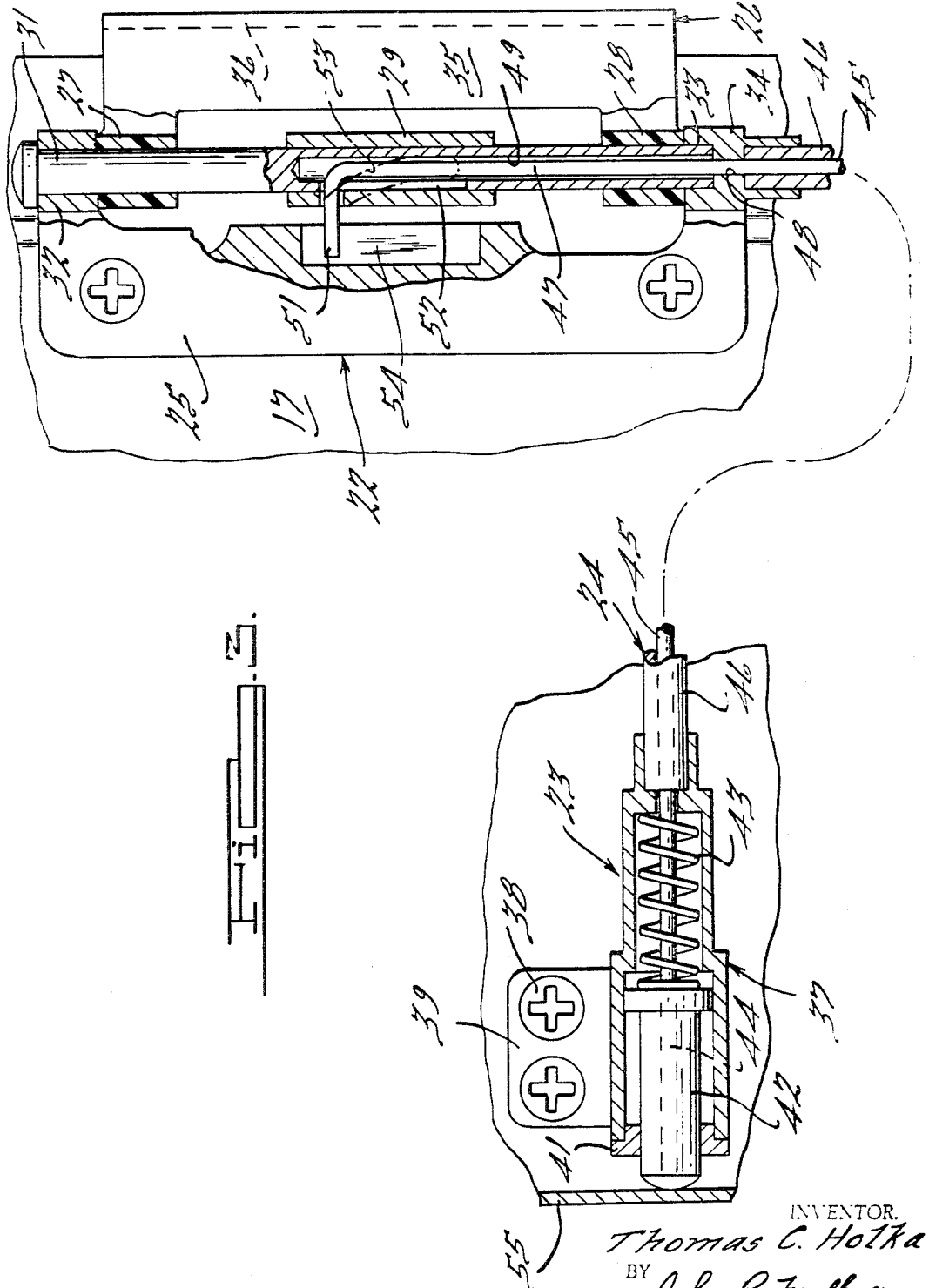

United States Patent Office

3,473,264
Patented Oct. 21, 1969

3,473,264
DOOR EDGE GUARD
Thomas C. Holka, Detroit, Mich., assignor to Ford Motor Company, Dearborn, Mich., a corporation of Delaware
Filed Dec. 20, 1967, Ser. No. 692,243
Int. Cl. E06b 7/20; B60j 5/00
U.S. Cl. 49—462                                 2 Claims

ABSTRACT OF THE DISCLOSURE

A door edge guard mechanism for an exposable edge of a vehicle door hingedly mounted on a vehicle body. The guard mechanism comprises a swingably retractable door edge protective member coupled by a transmitting member to a door position sensing means. Movement of the door position sensing means into and out of contact with a body member as the vehicle door is moved into and out of closed position on the vehicle body causes corresponding movement of the door edge protective member into a retracted position or a door edge protective position, respectively.

BACKGROUND OF THE INVENTION

It is rare in urban areas to find a vehicle that does not have a plurality of minute indentations in the body side and door panels. This results from the fact that it is most difficult in a congested parking lot or garage to open a vehicle door with enough finesse to avoid banging the door edge into an adjacent vehicle or building wall. One of the reasons for this is that the convetnional combination door check and hold-open device usually operates in a sequence of steps. These devices are spring loaded so that the door moves in a series of almost uncontrollable jerks as each step is overcome.

Molding strip type edge guards are available but these are primarily for the purpose of protecting the edge of a vehicle door being swung to an open position rather than to protect the panel of an adjacent vehicle which may be in the path of the swinging door. These molding strip door edge guards are usually manufactured of metal inasmuch as plastic guards, which would have a cushioning effect, have a tendency to fall off the door when the temperatures are high or to become brittle and break when the temperatures are low. Attempts have been made to devise retractable door edge guards or door bumpers for vehicles, such as shown in U.S. Patents 2,678,232 and 3,243,222. Devices of this type are usually rather complex and require operating mechanisms which must be mounted interiorly of the door panels where they are in position to interfere with the space requirements for window regulators, door latch mechanisms, and other accessories to be found within the doors of modern vehicles.

Accordingly, it is an object of the present invention to provide a door edge guard mechanism which can be mounted exteriorly on the free end wall of the vehicle door and which is adapted to automatically cover the door edge to provide a cushion between the latter and the body panel of an adjacently parked vehicle or an adjacent building wall when the door is moved to an opened position. The protective member automatically is retracted to a self-storing position when the vehicle door on which it is mounted is moved to a closed position.

SUMMARY OF THE INVENTION

The present invention relates to a door edge guard mechanism for the free end wall juxtaposed hem flange edge of a vehicle door hingedly mounted on a vehicle body. The guard mechanism comprises a support means on the free end wall of the door, a door hem flange edge protective member preferably formed of a plastic material, and a hinge pin means mounting the protective member on the support means for swinging movement about a hinge axis substantially paralleling the hem flange edge. The protective member is swingable about its hinge axis between a hem flange edge overlapping position and a retracted position behind the hem flange edge. Door position sensing means are mounted on the free end wall of the door and are shiftable to and from a predetermined position upon engagement or disengagement respectively, with a part of the vehicle body as the door is moved to and from door closed position. The protective member is coupled to the door position sensing means by a transmitting means which is operative upon the sensing means being shifted to and from the predetermined position to retract the protective member or to position the latter in hem flange overlapping position, respectively.

DESCRIPTION OF THE DRAWINGS

Other objects, advantages and features of the present invention will be made more apparent as this description proceeds reference being had to the accompanying drawings, wherein:

FIG. 1 is a perspective view of a door edge guard mechanism mounted on the free edge wall of a swingable door, as embodied in the present invention;

FIG. 2 is a sectional view taken substantially on the line 2—2 of FIG. 1; and

FIG. 3 is a sectional diagrammatic view illustrating the components of the door edge mechanism.

DETAILED DESCRIPTION OF THE INVENTION

Before explaining in detail the door edge guard mechanism embodying the present invention, a brief explanation of the environment in which it is to be used will help to understand its features. The conventional vehicle door is hinged at one end (not shown) for swinging movement about a substantially vertical hinge axis. The other end of the door comprises a free edge or jamb facing wall 11 which terminates in a hem flange 12 to which the outer panel or outer skin 13 of the door is attached. A terminal edge 14 of the outer panel 13 is usually rolled over the end of the flange 12. In closed position of the door, see FIG. 2, the free edge wall 11 faces an end wall 15 of a body pillar or other structural member framing the body opening in which the door is mounted. The outer panel 13 of the door is aligned with an outer panel 16 of the vehicle body.

Interposed between the end wall 11 and the flange 12 is a short wall 17 substantially normal to the end wall 11 and spaced from panel 13. Wall 17 is joined to flange 12 by a short wall 18.

The corner between the body pillar end wall 15 and the outer panel 16 of the vehicle body is notched or rabbetted, as indicated by the two angularly related walls 19 and 21. The wall 19 is substantially normal to the end wall 15 of the body pillar and the wall 21 is substantially normal to the outer body panel 16 of the vehicle body.

The function of the door edge guard mechanism of the present invention is to protect the hem flange edge 14 against damage to itself and damage to the body or door panel of an adjacent vehicle with which it might come in contact when the door on which it is mounted is swung open. It is desirable that the door edge guard mechanism be in a concealed position when the door on which it is mounted is in a closed position. The door edge guard of the present invention is constructed and arranged to achieve these functions as follows:

The door edge guard mechanism comprises three major components—a door edge protective means, generally designated 22, comprising a protective member and its supporting means; a door position sensing means generally designated 23, and a transmitting means, generally designated 24 coupling the sensing means 23 to the protective means 22.

The door edge guard mechanism protective means 22 comprises a bracket 25 bolted to the short wall portion 17 of the jamb facing end wall of the door. The bracket 25 carries a protective member, generally designated 26, which is preferably formed of a resilient plastic material. It is a vertically elongated member having at its upper and lower ends hinge pin receiving bosses 27 and 28, respectively. Between the hinge pin receiving bosses 27 and 28, the protective member 26 has a cylindrical portion 29. A hinge pin 31 extends through the upper apertured end 32 of the bracket 25 into a recess 33 in the lower end 34 of the bracket 25.

The protective member 26 may be considered as having a fin 35 extending radially from the hinge pin bosses 27 and 28 and the cylindrical portion 29. The fin 35 terminates in an elongated curved extension or lip portion 36. The curved extension or lip portion 36 is adapted to overlap the terminal edge 14 of the door when in protective relationship to this edge as shown in dot-dash outline in FIG. 2.

The protective member 26 is swingable about the hinge pin axis of the hinge pin 31 between the hem flange edge 14 overlapping position shown in dot-dash outline and the retracted position as shown in solid outline in FIG. 2. Swinging movement of the protective member 26 is achieved by the coaction of the door position sensing means 23 and the transmitting means 24.

The door position sensing means 23 comprises a cylindrical housing 37 secured by bolts 38 projecting through a bracket 39 into the door end wall 11. Projecting from one end 41 of the housing 37 is a plunger 42, the latter being urged outwardly by a spring 43. The plunger 42 is coupled to one end 44 of a cable 45 housed within a sheath 46.

The end 47 of the cable 45 opposite its end 44 projects through an aperture 48 in boss 34 of the bracket 25 and then through a bore 49 in the hinge pin 31. The cable end 47 terminates in a right angle projection 51 which projects through a vertical slot 52 in the hinge pin 31. The projection 51 also projects through a spiral slot 53 in the cylindrical portion 29 of the protective member 26. The bracket 25 is also provided with a vertical slot 54 to receive the projection end 51. The function of the several slots and their relationship to the projection 51 is as follows:

The slots 52 and 54 guide the cable projection 51 for movement longitudinally of the hinge pin axis. The spiral slot 53 in the cylindrical portion 29 of the protective member 26 acts as a cam surface which, as the projection 51 moves longitudinally of the hinge pin axis, causes the protective member 26 to be swung between the solid and the dot-dash outline positions shown in FIG. 2.

Referring to FIG. 1, the parts of the door edge guard mechanism are shown as they appear when the vehicle door is in an opened position. The plunger 42 is fully extended from the housing 37 and the projection 51 is at the lower end of the slot 53 in the protective member 26. The lip portion 36 of the protective member 26 overlaps the terminal edge 14 of the door. Thus, if the door is swung into a building wall or a panel of an adjacent vehicle the resilient plastic lip portion will act as a cushion between the edge 14 of the vehicle door and the abutting surface of the building wall or vehicle panel. This has the effect of keeping the paint on the edge 14 from being chipped or from chipping the paint on the panel of an adjacent vehicle.

When the vehicle door is swung to a closed position, the plunger 42 will abut a wall, designated 55 in FIG. 3, of the door opening framing structure and the plunger 42 will be pushed inwardly into the housing 37. This inward movement of the plunger 42 is transmitted through the cable 45 to the projection 51 causing the latter to move upwardly in the slots 52 and 54 which guide and restrict its movement to a direction longitudinally of the hinge axis. This causes the protective member 26 to be swung from the dot and dash outline position of FIG. 2 toward the solid outline position so that when the door is in fully closed position the protective member will be retracted to the pocket formed by the walls 19, 21 on the body pillar 15 and the walls 12, 18 of the door edge structure.

Movement of the plunger 42 inwardly into the housing 37 places the spring 43 on the compression. When the door is next opened, the spring 43 will force the plunger 42 outwardly of its housing 37 and cause the cable 45 to be moved in the direction to pull the projection 51 downwardly. The resultant camming action on the spiral slot 53 causes the protective member to be swung in a counterclockwise direction, as viewed in FIG. 2, so that the protective lip portion assumes an overlapping relationship to the edge 14 of the door.

It is to be understood that this invention is not limited to the exact construction illustrated and described above or in the abstract preceding the specification, but that various changes and modifications may be made without departing from the scope and spirit of the invention.

I claim:

1. A door edge guard mechanism for a free end wall juxtaposed hem flange edge of a vehicle door hingedly mounted on a vehicle body, comprising:

support means on the free end wall of the door, a door hem flange edge protective member, hinge pin means mounting said protective member on said support means for swinging movement about a hinge axis substantially paralleling the hem flange edge, said protective member being swingable about said hinge axis between a hem flange edge overlapping position and a retracted position, door position sensing means comprising a spring loaded sensor mounted on the free end wall of the door and shiftable to and from a predetermined position upon engagement or disengagement, respectively, with a part of the vehicle body as the door is moved to and from door closed position.

and transmitting means coupling said protective member to said sensing means, said transmitting means comprising a cable terminating in a projection extending laterally thereof, said protective member having a cylindrical portion concentric with the hinge axis, said cylindrical portion having a substantially longitudinally extending spiral slot therein through which said cable projection projects, the coaction between the projection and slotted cylindrical portion as said cable is shifted longitudinally of the hinge axis causing said protective member to swing about said hinge axis, said transmitting means thereby being operative upon said sensing means being shifted to and from said predetermined position to retract said protective member or to position the latter in hem flange overlapping position, respectively.

2. A door edge guard mechanism for a free end wall juxtaposed hem flange edge of a vehicle door hingedly mounted on a vehicle body, comprising:

a bracket mounted on the free end wall of the door, a door hem flange edge protective member, said protective member having a cylindrical body portion with a radially extending fin projecting from the surface thereof, said fin terminating in an elongated curved extension, hinge pin means mounting said projective member cylindrical body portion on said bracket for swinging movement about a hinge axis substantially paralleling the hem flange edge, said protective member being swingable about said hinge axis between a position in which said curved extension overlaps the hem flange edge or a position in which the curved extension is retracted behind said hem flange edge, door position sensing means comprising a spring loaded plunger mounted on the free end wall of the door and shiftable to and from a predetermined position upon engagement or disengagement, respectively, with a part of the vehicle body as the door is moved to and from door closed position, and transmitting means coupling said protective member to said sensing means, said transmitting means comprising a sheathed cable, said cable terminating in a projection extending laterally thereof, said protective member cylindrical portion having a substantially longitudinally extending spiral slot therein through which said cable projection projects, the coaction between the projection and slotted cylindrical portion as said cable is shifted longitudinally of the hinge axis by said transmitting means upon said sensing means engaging or disengaging a portion of the vehicle body causing said protective member curved extension to be bodily shifted into and out of overlapping relationship to said hem flange edge.

References Cited

UNITED STATES PATENTS

| | | | |
|---|---|---|---|
| 2,678,232 | 5/1954 | Barry | 49—462 |
| 3,280,510 | 10/1966 | Vaux | 49—462 X |
| 3,380,193 | 4/1968 | Hill | 49—462 |

KENNETH DOWNEY, Primary Examiner

U.S. Cl. X.R.

293—1